United States Patent
Frövik et al.

(10) Patent No.: US 10,816,384 B2
(45) Date of Patent: Oct. 27, 2020

(54) RADAR LEVEL GAUGE SYSTEM AND METHOD FOR INTERFACE MEASUREMENT

(71) Applicant: Rosemount Tank Radar AB, Mölnlycke (SE)

(72) Inventors: Christer Frövik, Linköping (SE); Anders Friedmann, Linköping (SE)

(73) Assignee: ROSEMOUNT TANK RADAR AB, Mölnlycke (SE)

( * ) Notice: Subject to any disclaimer, the term of this patent is extended or adjusted under 35 U.S.C. 154(b) by 444 days.

(21) Appl. No.: 15/798,677

(22) Filed: Oct. 31, 2017

(65) Prior Publication Data

US 2019/0128727 A1 May 2, 2019

(51) Int. Cl.
*G01F 23/284* (2006.01)
*G01S 7/292* (2006.01)
*G01S 7/00* (2006.01)

(52) U.S. Cl.
CPC .......... *G01F 23/284* (2013.01); *G01S 7/2922* (2013.01); *G01S 7/003* (2013.01)

(58) Field of Classification Search
CPC ....... G01F 23/284; G01S 7/2922; G01S 7/003
USPC .................. 342/124, 93, 121, 159
See application file for complete search history.

(56) References Cited

U.S. PATENT DOCUMENTS

| 5,969,666 A | 10/1999 | Burger et al. |
| 8,149,648 B2 * | 4/2012 | Daigle .................. G01F 23/284 367/98 |
| 2007/0194981 A1 * | 8/2007 | Hagg ...................... G01S 13/08 342/124 |
| 2013/0231877 A1 | 9/2013 | Weber et al. |
| 2019/0056257 A1 * | 2/2019 | Bellmann ................ G01N 9/26 |

FOREIGN PATENT DOCUMENTS

| EP | 2 365 302 | 9/2011 |
| WO | WO 01/75475 | 10/2001 |

OTHER PUBLICATIONS

Notification of Transmittal of the International Search Report and the Written Opinion of the International Searching Authority from PCT/EP2018/077039, dated Feb. 22, 2019.

* cited by examiner

*Primary Examiner* — Bo Fan
(74) *Attorney, Agent, or Firm* — Westman, Champlin & Koehler, P.A.

(57) ABSTRACT

A method of determining at least a first interface level of a first interface in a tank containing a stratified substance composition, comprising the steps of generating and transmitting an electromagnetic transmit signal; guiding the transmit signal at least partly through the stratified substance composition; returning an electromagnetic reflection signal resulting from reflection of the transmit signal; receiving, the reflection signal; determining, based on the reflection signal and a timing relation between the reflection signal and the transmit signal, an echo signal exhibiting an echo signal strength as a function of a propagation parameter indicative of position along the probe; and determining, the first interface level based on a first propagation parameter value indicative of a first threshold position for which the echo signal has reached a predetermined first threshold signal strength, and a first offset indicative of a first offset distance from the first threshold position.

14 Claims, 7 Drawing Sheets

RADAR LEVEL GAUGE SYSTEM AND METHOD FOR INTERFACE MEASUREMENT

TECHNICAL FIELD OF THE INVENTION

The present invention relates to a radar level gauge system and to a method of determining at least a first interface level of a first interface in a tank containing a stratified substance composition.

TECHNICAL BACKGROUND

Radar level gauge systems are in wide use for measuring filling levels in tanks. Radar level gauging is generally performed either by means of non-contact measurement, whereby electromagnetic signals are radiated towards the product contained in the tank, or by means of contact measurement, often referred to as guided wave radar (GWR), whereby electromagnetic signals are guided towards and into the product by a probe. The probe is generally arranged vertically in the tank. The electromagnetic signals are reflected at the surface of the product, and the reflected signals are received by a receiver or transceiver comprised in the radar level gauge system. Based on the transmitted and reflected signals, the distance to the surface of the product can be determined.

More particularly, the distance to the surface of the product is generally determined based on the time between transmission of an electromagnetic signal and receipt of the reflection thereof in the interface between the atmosphere in the tank and the product contained therein. In order to determine the actual filling level of the product, the distance from a reference position to the surface is determined based on the above-mentioned time (the so-called time-of-flight) and the propagation velocity along the probe of the electromagnetic signals.

In some cases a tank may contain a stratified substance composition with several interfaces between substances at different levels. When two interfaces are close together, currently available GWR-systems may be unable to reliably determine the levels of the two interfaces.

If, for example, an oil layer is floating on water in a tank, currently available GWR-systems may require that the oil layer has a given minimum thickness to be capable of reliably determining the level of the oil surface (the level of the interface between the tank atmosphere and the oil).

It would be desirable to provide an improved radar level gauge system and method allowing filling level determination for a stratified substance composition with a thinner substance layer.

SUMMARY OF THE INVENTION

In view of the above, it would be desirable to provide for improved determination of at least a first interface level in a stratified substance composition, in particular allowing filling level determination for a stratified substance composition with a thinner substance layer.

According to a first aspect of the present invention, it is therefore provided a method of determining at least a first interface level of a first interface in a tank containing a stratified substance composition including at least a first substance having a first density, a second substance having a second density greater than the first density, and a third substance having a third density greater than the second density, using a radar level gauge system comprising: a transceiver; a probe arranged to extend substantially vertically through the stratified substance composition from a first probe end coupled to the transceiver to a second probe end; and processing circuitry, the method comprising the steps of: generating and transmitting, by the transceiver, an electromagnetic transmit signal; guiding, by the probe, the transmit signal at least partly through the stratified substance composition; returning, by the probe, an electromagnetic reflection signal resulting from reflection of the transmit signal at the first interface between the first substance and the second substance, and at a second interface between the second substance and the third substance; receiving, by the transceiver, the reflection signal; determining, based on the reflection signal and a timing relation between the reflection signal and the transmit signal, an echo signal exhibiting an echo signal strength as a function of a propagation parameter indicative of position along the probe; and determining, by the processing circuitry, the first interface level based on a first propagation parameter value indicative of a first threshold position along the probe for which the echo signal has reached a predetermined first threshold signal strength, and a first offset indicative of a first offset distance along the probe from the first threshold position towards the second probe end.

The "substances" are not limited to any particular material phase, and may thus include solids, liquids and gases. Some examples of substances can be various petroleum products, water, sludge or sand etc.

In particular, the first substance may be a gaseous tank atmosphere, the second substance may be a first liquid, such as oil, and the third substance may be a second liquid, such as water.

The "transceiver" may be one functional unit capable of transmitting and receiving electromagnetic signals, or may be a system comprising separate transmitter and receiver units.

The tank may be any container or vessel capable of containing a product, and may be metallic, or partly or completely non-metallic, open, semi-open, or closed.

The probe should be understood to be a waveguide designed for guiding electromagnetic signals. The probe may be rigid or flexible and may advantageously be made of metal, such as stainless steel.

The propagation parameter may be any parameter indicative of a position along the probe. For example, the propagation parameter may be any one of a time-of-flight of the reflection signal, a distance from a reference position at the first probe end, and a level in the tank, etc.

The present invention is based upon the realization that the echo signal may not exhibit a first local extremum indicative of reflection at the first interface and a second local extremum indicative of reflection at the second interface in situations where the first interface and the second interface are close to each other. The present inventors have further realized that the first interface level of the first interface can be determined based on the position along the probe where the echo signal strength reaches a predetermined first threshold value, and a first offset distance from that position towards the second probe end, and that this approach requires a smaller minimum difference between levels of the first and second interfaces for being able to determine at least the first interface level.

According to various embodiments, the method may further comprise the step of identifying a first local extremum parameter value indicative of a first local extremum position, spaced apart along the probe from the first threshold position towards the second probe end, for which the echo signal exhibits a first local extremum.

When the first local extremum position is spaced apart along the probe from the first threshold position by more than a predetermined second distance, greater than the above-mentioned first offset distance, a second interface level of the second interface may be determined based on the first local extremum position.

When the first local extremum position is spaced apart along the probe from the first threshold amplitude position by a predetermined third distance, shorter than the above-mentioned second distance, the first interface level may be determined based on the first local extremum position.

According to embodiments, the method may further comprise the steps of: determining, by the processing circuitry, a second interface level of the second interface based on a second propagation parameter value indicative of a second threshold position along the probe, between the first threshold position and the second probe end, for which the echo signal has reached a predetermined second threshold signal strength, and a predetermined second offset indicative of a predetermined second offset distance along the probe from the second threshold position towards the second probe end.

The first offset may advantageously be a predetermined value or may be selected among a set of predetermined values based on at least one measured property, such as a temperature or a system specific property. Furthermore, the first offset may depend on at least one material property of the second substance, such as the dielectric constant of the second substance. For example, the first offset may be determined based on an estimated echo signal indicative of reflection of the transmit signal at the first interface only. Alternatively, or in combination, the first offset may be determined based on one or several echo signals resulting from reflection of the transmit signal at the first interface when the first interface is sufficiently separated from the second interface for the reflection at the first interface to result in an isolated peak in the echo signal. Such a measured isolated peak in the echo signal can be used to establish a mathematical model of the peak. The mathematical model, which may be simple (as will be described further below) or more complex can be used to determine the first offset for a given first threshold.

According to embodiments, furthermore, the transmit signal may comprise a first pulse train having a first pulse repetition frequency; and the method may further comprise the steps of: generating, by the transceiver, an electromagnetic reference signal in the form of a second pulse train having a second pulse repetition frequency controlled to differ from the first pulse repetition frequency by a frequency difference; and the echo signal is determined based on the reflection signal, the reference signal, and the frequency difference.

The pulses in the first pulse train may advantageously be so-called DC-pulses.

It should be noted that the steps of methods according to embodiments of the present invention need not necessarily be carried out in any particular order, unless explicitly or implicitly required.

According to a second aspect of the present invention, it is provided a radar level gauge system for installation at a tank containing a stratified substance composition including at least a first substance having a first density, a second substance having a second density greater than the first density, and a third substance having a third density greater than the second density, to determine at least a first interface level of a first interface between the first substance and the second substance, the radar level gauge system comprising: a transceiver for generating, transmitting and receiving electromagnetic signals; a probe arranged to extend substantially vertically through the stratified substance composition from a first probe end coupled to the transceiver to a second probe end, the probe being configured to guide an electromagnetic transmit signal from the transceiver at least partly through the stratified substance composition, and to return an electromagnetic reflection signal resulting from reflection of the transmit signal at the first interface between the first substance and the second substance, and at a second interface between the second substance and the third substance; echo signal forming circuitry connected to the transceiver for forming, based on the reflection signal and a timing relation between the reflection signal and the transmit signal, an echo signal exhibiting an echo signal strength as a function of a propagation parameter indicative of position along the probe; and level determining circuitry connected to the echo signal forming circuitry for determining the first interface level based on a first propagation parameter value indicative of a first threshold position along the probe for which the echo signal has reached a predetermined first threshold signal strength, and a first offset indicative of a first offset distance along the probe from the first threshold position towards the second probe end.

According to various embodiments, the transceiver may comprise: transmission signal generating circuitry for generating the transmit signal in the form of a first pulse train having a first pulse repetition frequency; and reference signal generating circuitry for generating an electromagnetic reference signal in the form of a second pulse train having a second pulse repetition frequency controlled to differ from the first pulse repetition frequency by a frequency difference; and the echo signal forming circuitry may be configured to form the echo signal based on the reflection signal, the reference signal, and the frequency difference.

Further embodiments of, and effects obtained through this second aspect of the present invention are largely analogous to those described above for the first aspect of the invention.

In summary, the present invention thus relates to a method of determining at least a first interface level of a first interface in a tank containing a stratified substance composition, comprising the steps of generating and transmitting an electromagnetic transmit signal; guiding the transmit signal at least partly through the stratified substance composition; returning an electromagnetic reflection signal resulting from reflection of the transmit signal; receiving, the reflection signal; determining, based on the reflection signal and a timing relation between the reflection signal and the transmit signal, an echo signal exhibiting an echo signal strength as a function of a propagation parameter indicative of position along the probe; and determining, the first interface level based on a first propagation parameter value indicative of a first threshold position for which the echo signal has reached a predetermined first threshold signal strength, and a first offset indicative of a first offset distance from the first threshold position towards the second probe end.

BRIEF DESCRIPTION OF THE DRAWINGS

These and other aspects of the present invention will now be described in more detail, with reference to the appended drawings showing example embodiments of the invention, wherein.

DETAILED DESCRIPTION OF AN EXAMPLE EMBODIMENT OF THE INVENTION

Figure 1:
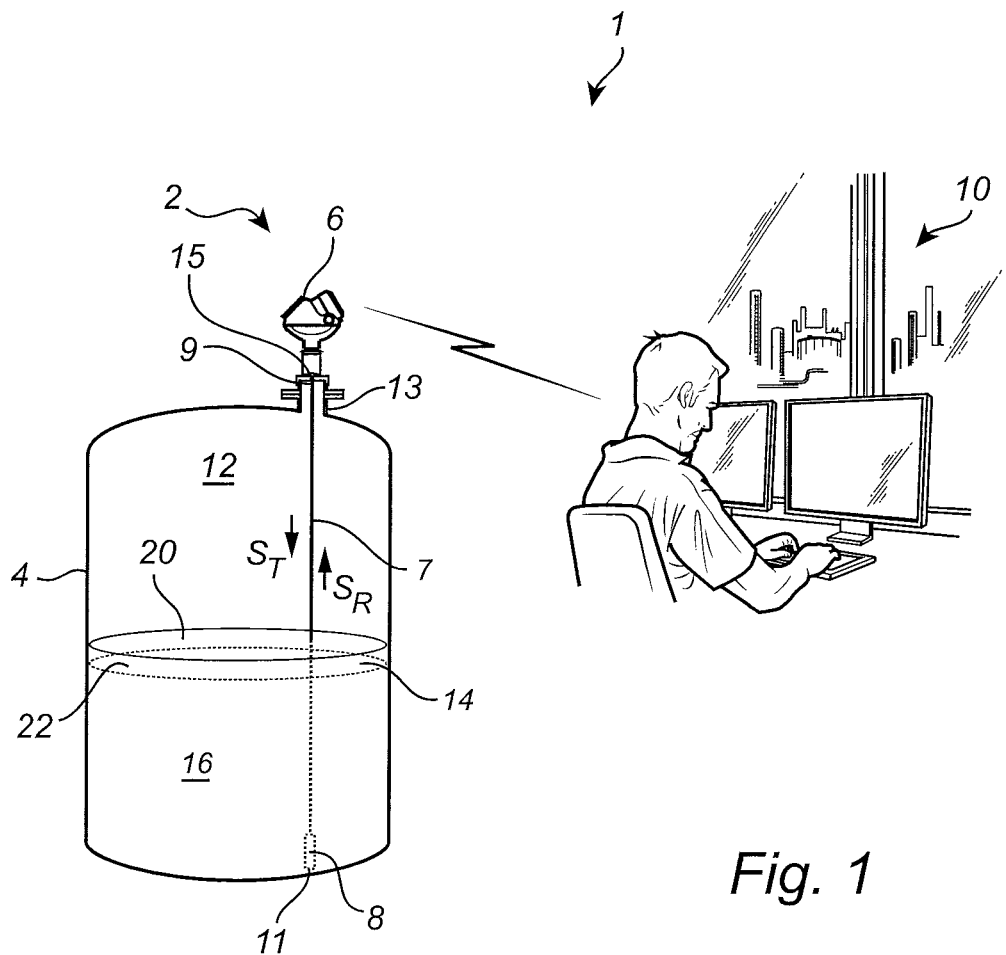
FIG. 1 schematically illustrates an exemplary tank arrangement comprising a radar level gauge system according to an embodiment of the present invention.

FIG. 1 schematically shows a level measuring system 1 comprising a radar level gauge system 2 according to an example embodiment of the present invention, and a host system 10 illustrated as a control room.

The radar level gauge system 2, which is of GWR (Guided Wave Radar) type, is arranged at a tank 4 having a tubular mounting structure 13 (often referred to as a "nozzle") extending substantially vertically from the roof of the tank 4.

In the present exemplary measurement situation, the tank 4 contains a stratified substance composition comprising a first substance 12, a second substance 14, and a third substance 16. In this particular example, the first substance 12 may be air or vapor, the second substance 14 may be oil, and the third substance 16 may be water. Due to the different densities of the substances in the stratified substance composition (and due to the fact that these substances are substantially immiscible), there is a first interface 20 between the first substance 12 and the second substance 14, and a second interface 22 between the second substance 14 and the third substance 16.

The radar level gauge system 2 is installed to measure the levels of the first 20, and second 22 interfaces. The radar level gauge system 2 comprises a measuring electronics unit 6 arranged outside the tank 4, and a probe 7, extending from a first probe end 9 coupled to the measuring electronics unit 6, through the tubular mounting structure 13, towards and into the stratified substance composition, to a second probe end 11 at the bottom of the tank.

In operation, an electromagnetic transmit signal $S_T$ is transmitted and guided by the probe 7 at least partly through the stratified substance composition. An electromagnetic reflection signal $S_R$ is returned, by the probe 7. Based on the reflection signal and a timing relation between the reflection signal and the transmit signal, the measurement unit 6 can determine at least the first interface level of the first interface 20. The radar level gauge system in FIG. 1 will now be described in more detail with reference to the schematic block diagram in FIG. 2.

Figure 2:
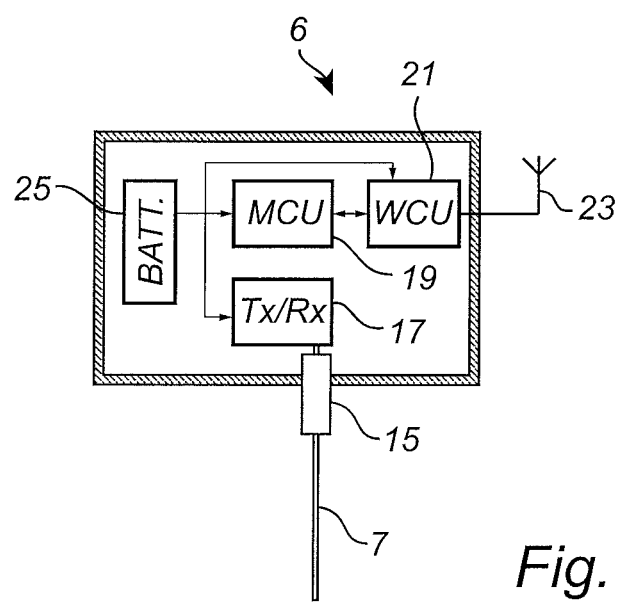
FIG. 2 is schematic illustration of the measurement unit comprised in the radar level gauge system in FIG. 1.

Referring to the schematic block diagram in FIG. 2, the measurement unit 6 of the radar level gauge system 2 in FIG. 1 comprises a transceiver 17, a measurement control unit (MCU) 19, a wireless communication control unit (WCU) 21, a communication antenna 23, an energy store, such as a battery 25, and a feed-through 15 between the outside and the inside of the tank 4.

As is schematically illustrated in FIG. 2, the MCU 19 controls the transceiver 17 to generate, transmit and receive electromagnetic signals. The transmitted signals pass through the feed-through 15 to the probe 7, and the received signals pass from the probe 7 through the feed-through 15 to the transceiver 17.

The MCU 19 may determine the first interface level and the second interface level, and provides values indicative of the first and second interface levels to an external device, such as a control center, from the MCU 19 via the WCU 21 through the communication antenna 23. The radar level gauge system 1 may advantageously be configured according to the so-called WirelessHART communication protocol (IEC 62591).

Although the measurement unit 6 is shown to comprise an energy store 25 and to comprise devices (such as the WCU 21 and the communication antenna 23) for allowing wireless communication, it should be understood that power supply and communication may be provided in a different way, such as through communication lines (for example 4-20 mA lines).

The local energy store need not (only) comprise a battery, but may alternatively, or in combination, comprise a capacitor or super-capacitor.

The radar level gauge system 2 in FIG. 1 will now be described in greater detail with reference to the schematic block diagram in FIG. 3.

Figure 3:
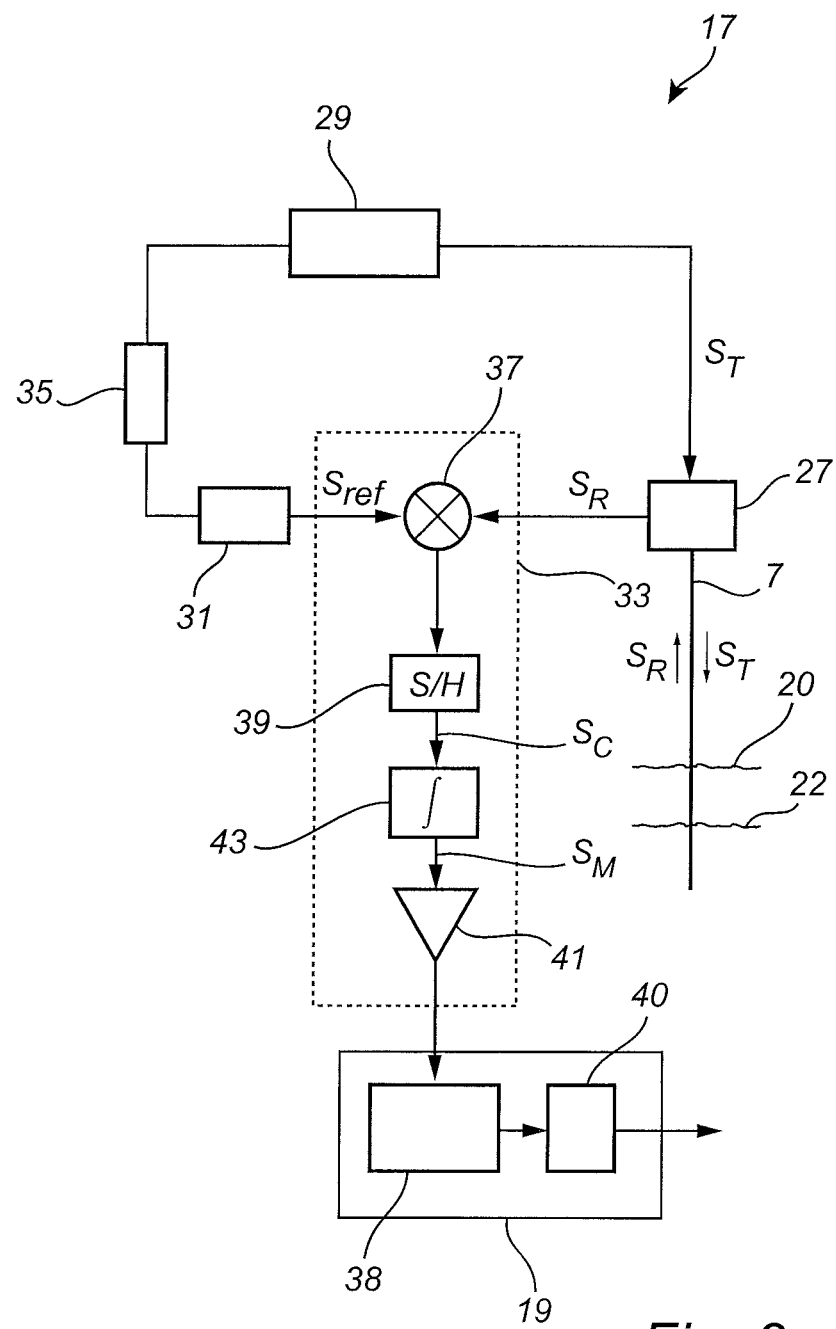
FIG. 3 is a schematic block diagram of the transceiver comprised in a radar level gauge system according to an embodiment of the present invention.

Referring now to FIG. 3, there is shown a more detailed block diagram of the transceiver 17 in FIG. 2.

As is schematically shown in FIG. 3, the transceiver 17 comprises a transmitter branch for generating and transmitting the transmit signal $S_T$, and a receiver branch for receiving and operating on the reflection signal $S_R$. As is indicated in FIG. 3, the transmitter branch and the receiver branch are both connected to a directional coupler 27 to direct signals from the transmitter branch to the probe 7 and to direct reflected signals being returned by the probe 7 to the receiver branch.

As is schematically indicated in FIG. 3, the transceiver 17 comprises pulse generating circuitry, here in the form of a first pulse forming circuit 29, a second pulse forming circuit 31, and a timing control unit 35 for controlling the timing relationship between the transmit signal output by the first pulse forming circuit 29 and the frequency shifted reference signal $S_{REF}$ output by the second pulse forming circuit 31.

The transmitter branch comprises the first pulse forming circuit 29, and the receiver branch comprises the second pulse forming circuit 31 and measurement circuitry 33.

As is schematically indicated in FIG. 3, the measurement circuitry 33 comprises a time-correlator, here in the form of a mixer 37, a sample-and-hold circuit 39 and amplifier circuitry 41. In embodiments of the present invention, the measurement circuitry 33 may further comprise an integrator 43.

Additionally, as was briefly described above with reference to FIG. 2, the radar level gauge system 1 comprises processing circuitry 19 (not shown in FIG. 3) that is connected to the measurement circuitry 33 for determining the first interface level of the first interface 20 and the second interface level of the second interface 22.

When the radar level gauge system 1 in FIG. 3 is in operation to perform a filling level determination, a time correlation is performed in the mixer 37 between the reflection signal $S_R$ and the reference signal $S_{REF}$ that is output by the second pulse forming circuit 31. The reference signal $S_{REF}$ is a pulse train with a pulse repetition frequency that controlled to differ from the pulse repetition frequency of the transmit signal $S_T$, by a predetermined frequency difference $\Delta f$. When a measurement sweep starts, the reference signal $S_{REF}$ and the transmit signal $S_T$ are in phase, and then parameter values indicative of a time correlation between the reference signal and the reflected signal $S_R$ is determined to form an echo signal, together with the frequency difference $\Delta f$. Based on an analysis of the echo signal, the first interface level and the second interface level can be determined, as will be described further below.

The time-expansion technique that was briefly described in the previous paragraph is well known to the person skilled in the art, and is widely used in pulsed radar level gauge systems.

As is clear from the above discussion, the output from the mixer 37 will be a sequence of values, where each value represents a time correlation between a pulse of the reference signal $S_{REF}$ and the reflection signal $S_R$. The values in this sequence of values are tied together to form a continuous signal using the sample-and-hold circuit 39.

In this context it should be noted that the sample-and-hold amplifier 39 is simply an illustrative example of a device capable of maintaining a voltage level over a given time, and that there are various other devices that can provide the desired functionality, as is well known to the person skilled in the art.

In the example embodiment of FIG. 3, the time-correlated signal—the correlation signal $S_C$— output from the sample-and-hold circuit 39 is provided to an integrator to form a measurement signal $S_M$, which is amplified by the low noise amplifier LNA 41. The above-mentioned echo signal can be formed, by echo signal forming circuitry 38, based on the measurement signal $S_M$ and the frequency difference $\Delta f$. The first and second interface filling level can, according to embodiments of the present invention, be determined by the level determining circuitry 40.

A first embodiment of the method according to the invention will now be described with reference to the schematic flow-chart in FIG. 4, with further reference to other figures as indicated.

In step 401, the transmit signal $S_T$ is generated as a pulse train of transmit pulses, and transmitted by the transceiver 17.

In step 402, taking place at the same time as step 401, the reference signal $S_{REF}$ is generated as a pulse train of reference pulses.

In step 403, the transmit signal $S_T$ is guided by the probe 7 at least partly through the stratified substance composition in the tank 4.

In step 404, the reflection signal $S_R$ resulting from reflection of the transmit signal $S_T$ at the first interface 20 and at the second interface 22 is returned by the probe 7 and received by the transceiver 17.

Figure 5A:
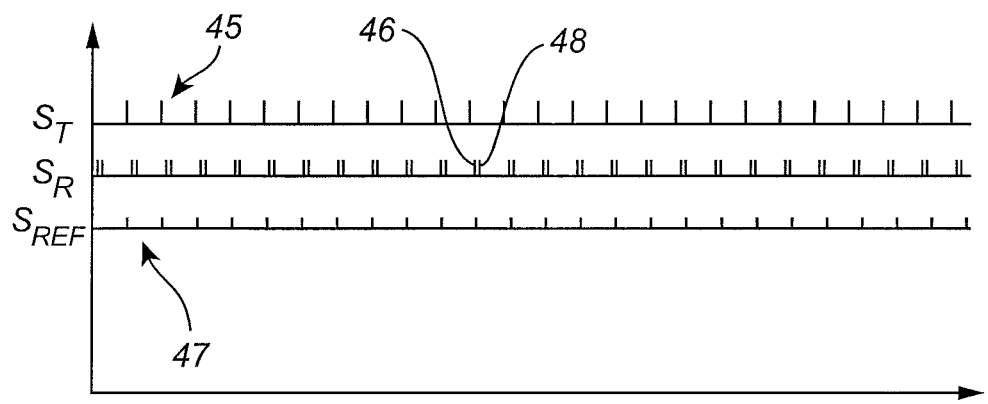
FIG. 5A schematically illustrates examples of the transmit signal, the surface reflection signal and the reference signal.
Figure 5B:
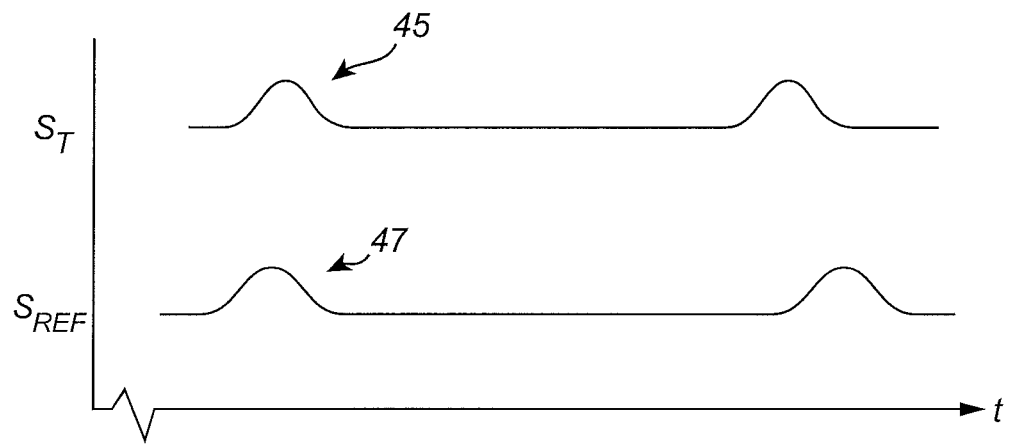
FIG. 5B is a partial enlarged view of a portion of the transmit signal and the reference signal in FIG. 5A.

For further illustration of the above-described steps 401 to 404, FIGS. 5A-B are now referred to.

FIG. 5A is a simplified timing diagram schematically showing the relative timing of the transmit signal $S_T$, the reflected signal $S_R$, and the reference signal $S_{REF}$ according to an example embodiment of the invention.

As is schematically indicated in FIG. 5A, the transmit signal $S_T$, formed by transmit pulses 45, and the reference signal $S_{REF}$, formed by reference pulses 47, are controlled by the timing circuitry 21 to be in phase at the start of the measurement sweep. A full measurement sweep may typically be defined by the difference frequency $\Delta f$, since the transmit signal $S_T$ and the reference signal $S_{REF}$, in this particular example, need to be in phase at the start of a new measurement sweep. As is also schematically indicated in FIG. 5A, the reflection signal $S_R$ here comprises a first set of reflection pulses 46 resulting from reflection of the transmit pulses 45 at the first interface 20, and a second set of reflection pulses 48 resulting from reflection of the transmit pulses 45 at the second interface 22. Each of the first 46 and second 48 set of reflection pulses has the same pulse repetition frequency as the transmit signal $S_T$, but lags behind the transmit signal $S_T$ with a time corresponding to the time-of-flight indicative of the distance to the first 20 and second 22 interface, respectively.

The reference signal $S_{REF}$ is initially in phase with the transmit signal, but will, due to its lower pulse repetition frequency "run away from" the transmit signal $S_T$ and "catch up with" the surface reflection signal $S_R$.

When the time-varying phase difference between the transmit signal $S_T$ and the reference signal $S_{REF}$ corresponds to the time-of-flights of the reflection pulses of the reflection signal $S_R$, there will be a time-correlation between pulses of the reference signal $S_{REF}$ and pulses of the surface reflection signal $S_R$. This time-correlation, results in a time-expanded correlation signal $S_C$, which can, in turn, be converted to a measurement signal $S_M$.

Example waveforms of the transmit pulses 45 and the reference pulses 47 are provided in the schematic magnified view in FIG. 5B.

Figure 4:
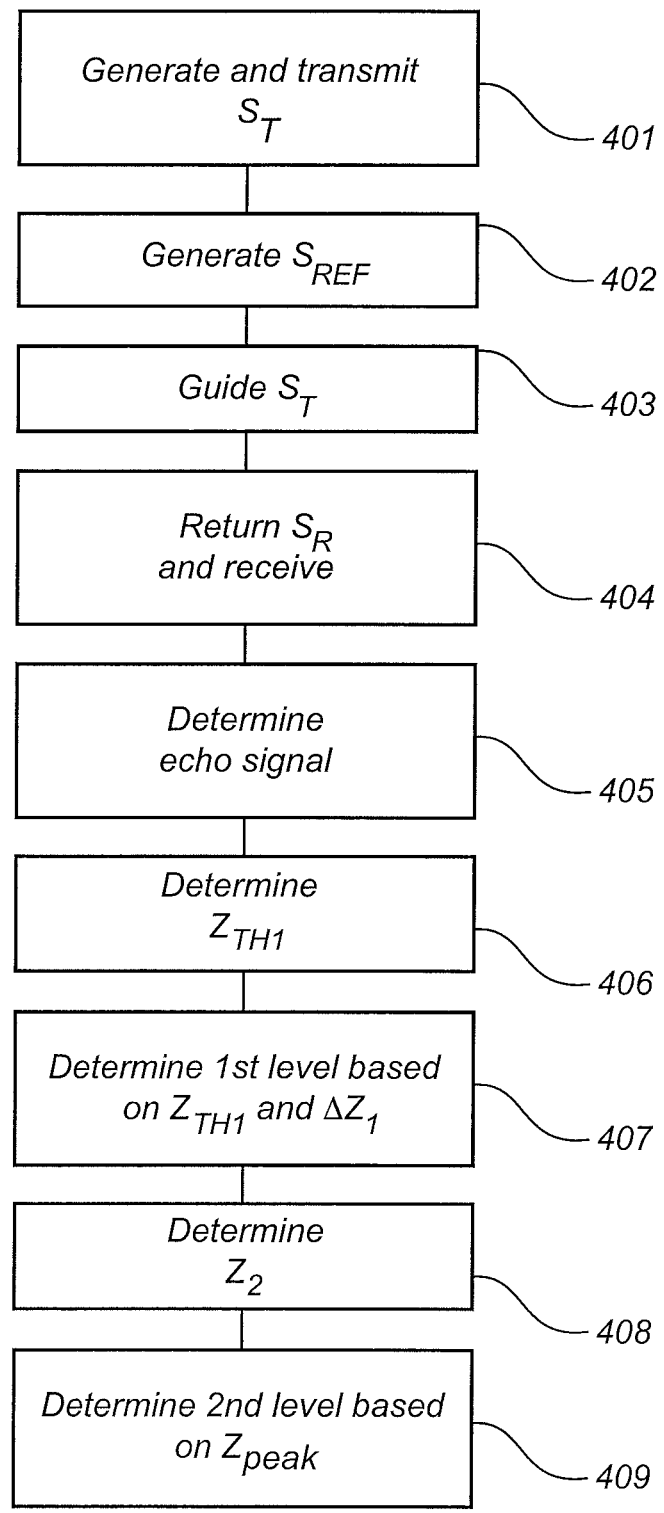
FIG. 4 is a flow-chart schematically illustrating a first example embodiment of the method according to the present invention.

Returning to the flow-chart in FIG. 4, the echo signal is determined, in step 405, by the echo signal forming circuitry 38, based on the reflection signal and a timing relation between the reflection signal and the transmit signal. For example, the echo signal may advantageously be determined based on the above-mentioned time-expanded measurement signal $S_M$ and the frequency difference $\Delta f$.

A first example of the echo signal, for an exemplary measurement situation, will now be described with reference to FIGS. 6A-B.

Figure 6A:
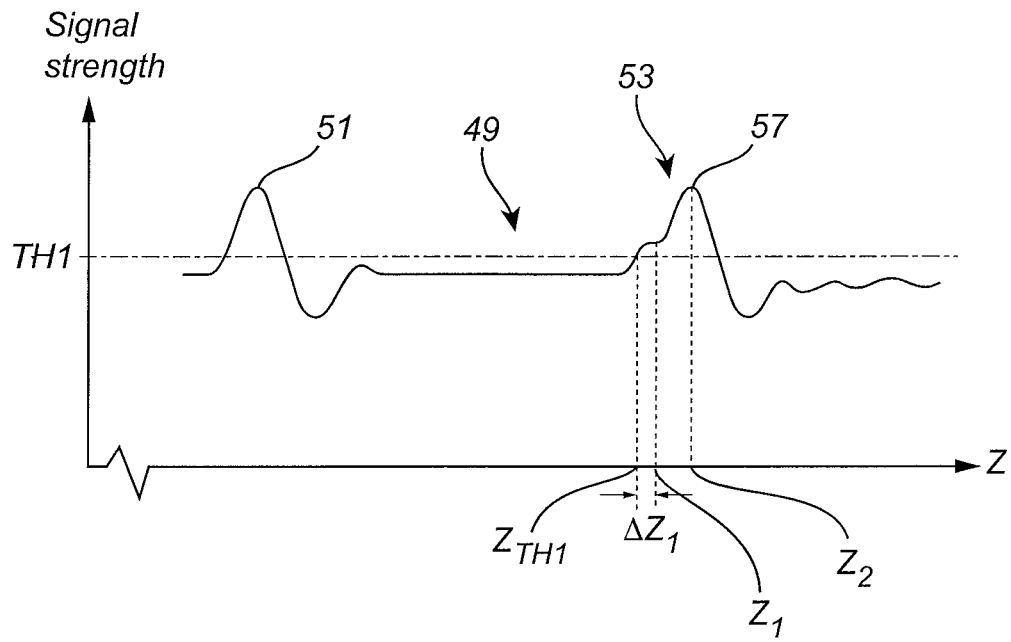
FIGS. 6A-B schematically illustrates the echo signal resulting from time-correlation of the surface reflection signal and the reference signal in FIG. 4A for a first example situation where the first interface and the second interface are close to each other.

FIG. 6A schematically shows an echo signal 49 exhibiting an echo signal strength (or amplitude) as a function of a propagation parameter indicative of position along the probe 7. In this case, the chosen propagation parameter is position z along the probe in relation to a reference position at the first probe end 9. FIG. 6B is an enlarged view of a portion of the echo signal 49 indicating reflection at the first 20 and second 22 interfaces in stratified substance composition in the tank 4.

As is schematically shown in FIG. 6A, the echo signal 49 indicates a reference echo 51 resulting from reflection of the transmit signal $S_T$ at a reference impedance transition (such as the feed-through 15) at the first probe end 9, and a substance interface echo 53 resulting from reflection of the transmit signal $S_T$ at the first 20 and second 22 interfaces in the tank 4.

Figure 6B:
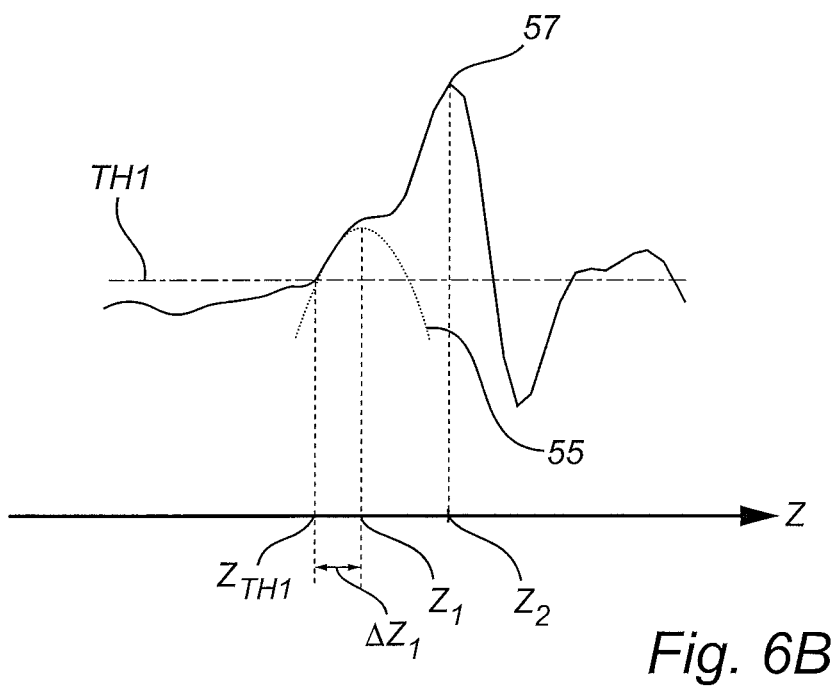

As is schematically shown in FIGS. 6A-B, the substance interface echo 53 is a broad and asymmetrical echo peak that only exhibits a single local extremum (maximum), so that the first interface 20 and the second interface 22 cannot be distinguished based on conventional peak detection.

Returning to the flow-chart in FIG. 4, the level of the first interface 20 is, in this embodiment of the present invention, instead determined using the procedure described below.

In step 406, a first threshold position $z_{TH1}$ along the probe for which the echo signal 49 has reached a predetermined first threshold signal strength TH1 is determined.

The first interface level is then determined, in step 407, based on the first threshold position $z_{TH1}$ and a predetermined first offset distance $\Delta z_1$ along the probe 7 from the first threshold position $z_{TH1}$ towards the second probe end 11.

The predetermined first offset distance $\Delta z_1$ is determined based on a model of the expected reflection of the transmit signal $S_T$ at the first interface 20 only, and/or on previous test measurements. The echo pulse shape of the reflection at the first interface 20 can be calculated based on known propagation properties of the probe 7 and the dielectric constants of the first substance 12 and the second substance 14 in the tank 4.

For the case where the first substance 12 is air, the second substance 14 is oil, and the probe 7 is an exemplary single conductor (Goubau) probe, the shape of the echo pulse 55 from reflection at the first interface 20 only can be approximated by the general curve shape expression:

$$f(x) = \text{SummitAmplitude} \cdot (1 - Qx^2),$$

where $Q \approx 95$.

This means that the sought first offset distance $\Delta z_1$ can be determined according to the following relation:

$$\Delta z_1 = \sqrt{\frac{1 - \frac{TH_1}{\text{SummitAmplitude}}}{Q}}$$

The position along the probe 7 of the first interface 20 in relation to the reference impedance transition (such as the feed-through 15) then becomes:

$$z_1 = z_{TH1} + \Delta z_1$$

The level of the first interface 20 can be determined based on the position $z_1$ (distance along the probe 7 from the reference impedance transition), and the known position of the reference position impedance (such as the feed-through 15).

In step 408, the local extremum 57 of the substance interface echo 53 is identified, and the position $z_2$ along the probe 7 of this local extremum 57 (or peak) is determined.

Since the position $z_2$ of the first local extremum 57 is spaced apart along the probe from the first threshold position $z_{TH1}$ by more than a predetermined second distance greater than the first offset distance $\Delta z_1$, the second interface level of the second interface 22 is determined, in step 409, based on the position $z_2$ (distance along the probe 7 from the reference impedance transition), and the known position of the reference position impedance (such as the feed-through 15).

Figure 7:
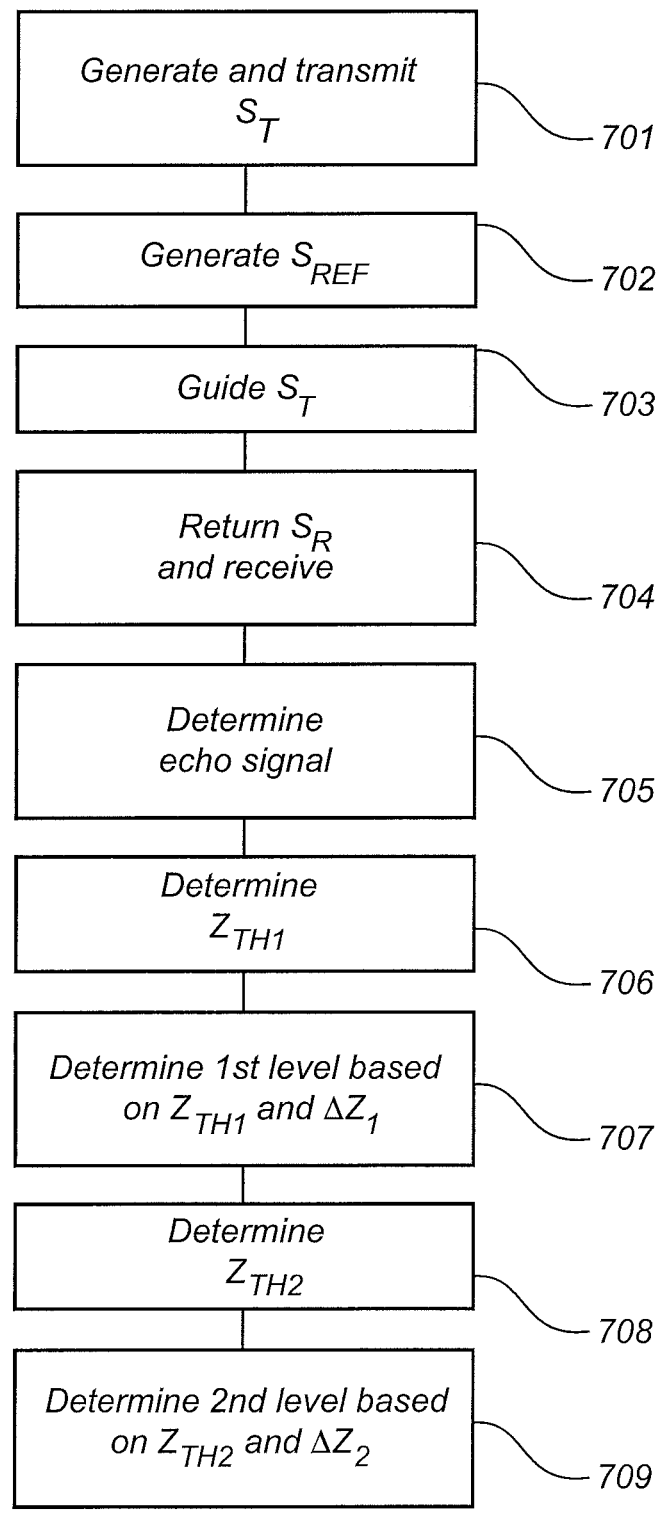
FIG. 7 is a flow-chart schematically illustrating a second example embodiment of the method according to the present invention.
Figure 8A:
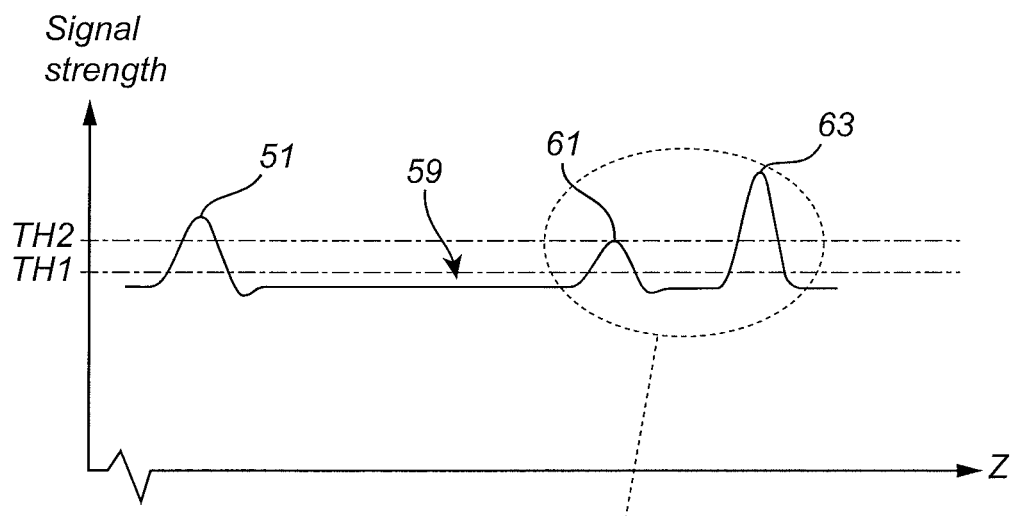
FIGS. 8A-B schematically illustrates the echo signal resulting from time-correlation of the surface reflection signal and the reference signal in FIG. 4A for a second example situation where the first interface and the second interface are further away from each other.
Figure 8B:
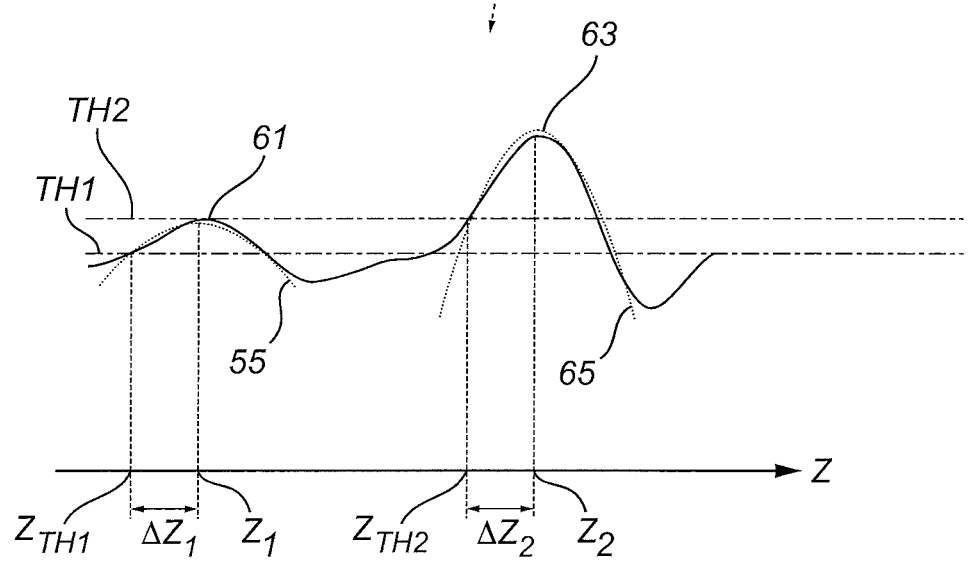

A second embodiment of the method according to the invention will now be described with reference to the schematic flow-chart in FIG. 7, with further reference to other figures as indicated. In this second example embodiment, the first interface 20 and the second interface 22 are sufficiently spaced apart to produce separate and separately distinguishable echo peaks. Referring to FIGS. 8A-B, the echo signal 59 comprises a first interface echo 61 resulting from reflection of the transmit signal $S_T$ at the first interface 20 and a second interface echo 63 resulting from reflection of the transmit signal $S_T$ at the second interface 22. In the situation illustrated in FIGS. 8A-B, it would be possible to determine the levels of the first 20 and second 22 interfaces using conventional peak detection. At least for some cases, it is, however, anticipated that embodiments of the present invention may provide improved measurement results. For instance, the measurement accuracy may be improved.

Steps 701 to 707 of this second embodiment correspond to steps 401 to 407 of the first embodiment described above with reference to the flow-chart in FIG. 4.

In step 708, a second threshold position $z_{TH2}$ along the probe for which the echo signal 59 has reached a predetermined second threshold signal strength TH2 is determined.

The second interface level is then determined, in step 709, based on the second threshold position zTH2 and a predetermined second offset distance $\Delta z_2$ along the probe 7 from the second threshold position $z_{TH2}$ towards the second probe end 11.

As was described above for the determination of the level of the first interface 20, the predetermined second offset distance $\Delta z_2$ is determined based on a model of the expected reflection of the transmit signal $S_T$ at the second interface 22 only, and/or on previous test measurements. The echo pulse shape 65 of the reflection at the second interface 22 can be calculated based on known propagation properties of the probe 7 and the dielectric constants of the second substance 14, and the third substance 16 in the tank 4. Such a model will be straight-forward for one of ordinary skill in the art to determine based on her/his knowledge and the example provided further above for the determination of the first offset distance $\Delta z_1$.

The position along the probe 7 of the first interface 22 in relation to the reference impedance transition (such as the feed-through 15) then becomes:

$$z_2 = z_{TH2} + \Delta z_2$$

The level of the second interface 22 can be determined based on the position $z_2$ (distance along the probe 7 from the reference impedance transition), and the known position of the reference position impedance (such as the feed-through 15).

The person skilled in the art realizes that the present invention by no means is limited to the preferred embodiments described above. For example, other probe configurations and other substances in the stratified substance composition may result in different selections of the threshold signal strengths and different estimations of the offset distances.

What is claimed is:

1. A method of determining a first interface level of a first interface and a second interface level of a second interface in a tank containing a stratified substance composition including at least a first substance having a first density, a second substance having a second density greater than said first density, and a third substance having a third density greater than said second density, using a radar level gauge system comprising:
    a transceiver;
    a probe arranged to extend substantially vertically through said stratified substance composition from a first probe end coupled to said transceiver to a second probe end; and
    processing circuitry,
    said method comprising the steps of:
    generating and transmitting, by said transceiver, an electromagnetic transmit signal;

guiding, by said probe, said transmit signal at least partly through said stratified substance composition;

returning, by said probe, an electromagnetic reflection signal resulting from reflection of said transmit signal at said first interface between said first substance and said second substance, and at said second interface between said second substance and said third substance;

receiving, by said transceiver, said reflection signal;

determining, based on said reflection signal and a timing relation between said reflection signal and said transmit signal, an echo signal exhibiting an echo signal strength as a function of a propagation parameter indicative of position along said probe;

determining, by said processing circuitry, said first interface level based on a first propagation parameter value indicative of a first threshold position along said probe for which said echo signal has reached a predetermined first threshold signal strength, and a first offset indicative of a first offset distance along said probe from said first threshold position towards said second probe end;

identifying a first local extremum parameter value indicative of a first local extremum position, spaced apart along said probe from said first threshold position towards said second probe end, for which said echo signal exhibits a first local extremum; and when said first local extremum position is spaced apart along said probe from said first threshold position by more than a predetermined second distance greater than said first offset distance, determining said second interface level of said second interface based on said first local extremum position.

2. The method according to claim 1, further comprising the step of:

when said first local extremum position is spaced apart along said probe from said first threshold position by less than a predetermined third distance shorter than said second distance, determining said first interface level based on said first local extremum position.

3. The method according to claim 2, further comprising the steps of:

identifying a second local extremum parameter value indicative of a second local extremum position, spaced apart along said probe from said first local extremum position towards said second probe end, for which said echo signal exhibits a second local extremum; and determining said second interface level based on said second local extremum position.

4. The method according to claim 1, further comprising the step of:

determining, using temperature indicating circuitry comprised in said radar level gauge system, a temperature parameter value indicative of a present temperature in said tank; and determining said first offset based on said present temperature.

5. The method according to claim 1, wherein said first offset is based on at least one material property of said second substance.

6. The method according to claim 1, wherein said first offset is based on at least one previously determined echo signal.

7. A method of determining a first interface level of a first interface and a second interface level of a second interface in a tank containing a stratified substance composition including at least a first substance having a first density, a second substance having a second density greater than said first density, and a third substance having a third density greater than said second density, using a radar level gauge system comprising:

a transceiver;

a probe arranged to extend substantially vertically through said stratified substance composition from a first probe end coupled to said transceiver to a second probe end; and processing circuitry, said method comprising the steps of:

generating and transmitting, by said transceiver, an electromagnetic transmit signal;

guiding, by said probe, said transmit signal at least partly through said stratified substance composition;

returning, by said probe, an electromagnetic reflection signal resulting from reflection of said transmit signal at said first interface between said first substance and said second substance, and at said second interface between said second substance and said third substance;

receiving, by said transceiver, said reflection signal;

determining, based on said reflection signal and a timing relation between said reflection signal and said transmit signal, an echo signal exhibiting an echo signal strength as a function of a propagation parameter indicative of position along said probe;

determining, by said processing circuitry, said first interface level based on a first propagation parameter value indicative of a first threshold position along said probe for which said echo signal has reached a predetermined first threshold signal strength, and a first offset indicative of a first offset distance along said probe from said first threshold position towards said second probe end; and determining, by said processing circuitry, a second interface level of said second interface based on a second propagation parameter value indicative of a second threshold position along said probe, between said first threshold position and said second probe end, for which said echo signal has reached a predetermined second threshold signal strength, and a predetermined second offset indicative of a predetermined second offset distance along said probe from said second threshold position towards said second probe end.

8. The method according to claim 1, wherein:

said transmit signal comprises a first pulse train having a first pulse repetition frequency; and said method further comprises the steps of:

generating, by said transceiver, an electromagnetic reference signal in the form of a second pulse train having a second pulse repetition frequency controlled to differ from said first pulse repetition frequency by a frequency difference; and said echo signal is determined based on said reflection signal, said reference signal, and said frequency difference.

9. A radar level gauge system for installation at a tank containing a stratified substance composition including at least a first substance having a first density, a second substance having a second density greater than said first density, and a third substance having a third density greater than said second density, to determine a first interface level of a first interface between said first substance and said second substance and a second interface level of a second interface between said second substance and said third substance, said radar level gauge system comprising:

a transceiver for generating, transmitting and receiving electromagnetic signals;

a probe arranged to extend substantially vertically through said stratified substance composition from a first probe end coupled to said transceiver to a second probe end, said probe being configured to guide an electromagnetic transmit signal from said transceiver at least partly through said stratified substance composition, and to return an electromagnetic reflection signal resulting from reflection of said transmit signal at said first interface between said first substance and said second substance, and at a second interface between said second substance and said third substance;

echo signal forming circuitry connected to said transceiver for forming, based on said reflection signal and a timing relation between said reflection signal and said transmit signal, an echo signal exhibiting an echo signal strength as a function of a propagation parameter indicative of position along said probe; and level determining circuitry connected to said echo signal forming circuitry for determining said first interface level based on a first propagation parameter value indicative of a first threshold position along said probe for which said echo signal has reached a predetermined first threshold signal strength, and a first offset indicative of a first offset distance along said probe from said first threshold position towards said second probe end, wherein said level determining circuitry is further configured to:

identify a first local extremum parameter value indicative of a first local extremum position, spaced apart along said probe from said first threshold position towards said second probe end, for which said echo signal exhibits a first local extremum; and when said first local extremum position is spaced apart along said probe from said first threshold position by more than a predetermined second distance greater than said first offset distance, determine said second interface level of said second interface based on said first local extremum position.

10. The radar level gauge system according to claim 9, wherein said level determining circuitry is further configured to, when said first local extremum position is spaced apart along said probe from said first threshold position by less than a predetermined third distance shorter than said second distance, determine said first interface level based on said first local extremum position.

11. The radar level gauge system according to claim 10, wherein said level determining circuitry is further configured to:

identify a second local extremum parameter value indicative of a second local extremum position, spaced apart along said probe from said first local extremum position towards said second probe end, for which said echo signal exhibits a second local extremum; and determine said second interface level based on said second local extremum position.

12. The radar level gauge system according to claim 9, wherein:

said radar level gauge system further comprises temperature indicating circuitry for indicating a temperature parameter value indicative of a present temperature in said tank; and said level determining circuitry is further configured to determining said first offset based on said temperature parameter value.

13. The radar level gauge system according to claim 9, wherein:

said transceiver comprises:

transmission signal generating circuitry for generating said transmit signal in the form of a first pulse train having a first pulse repetition frequency; and reference signal generating circuitry for generating an electromagnetic reference signal in the form of a second pulse train having a second pulse repetition frequency controlled to differ from said first pulse repetition frequency by a frequency difference; and said echo signal forming circuitry is configured to form said echo signal based on said reflection signal, said reference signal, and said frequency difference.

14. The radar level gauge system according to claim 9, wherein said probe is a single conductor probe.

\* \* \* \* \*